Feb. 4, 1969 — W. HIRSH — 3,425,800
PRODUCTION OF CRYSTALLINE ZEOLITES
Filed Oct. 5, 1967
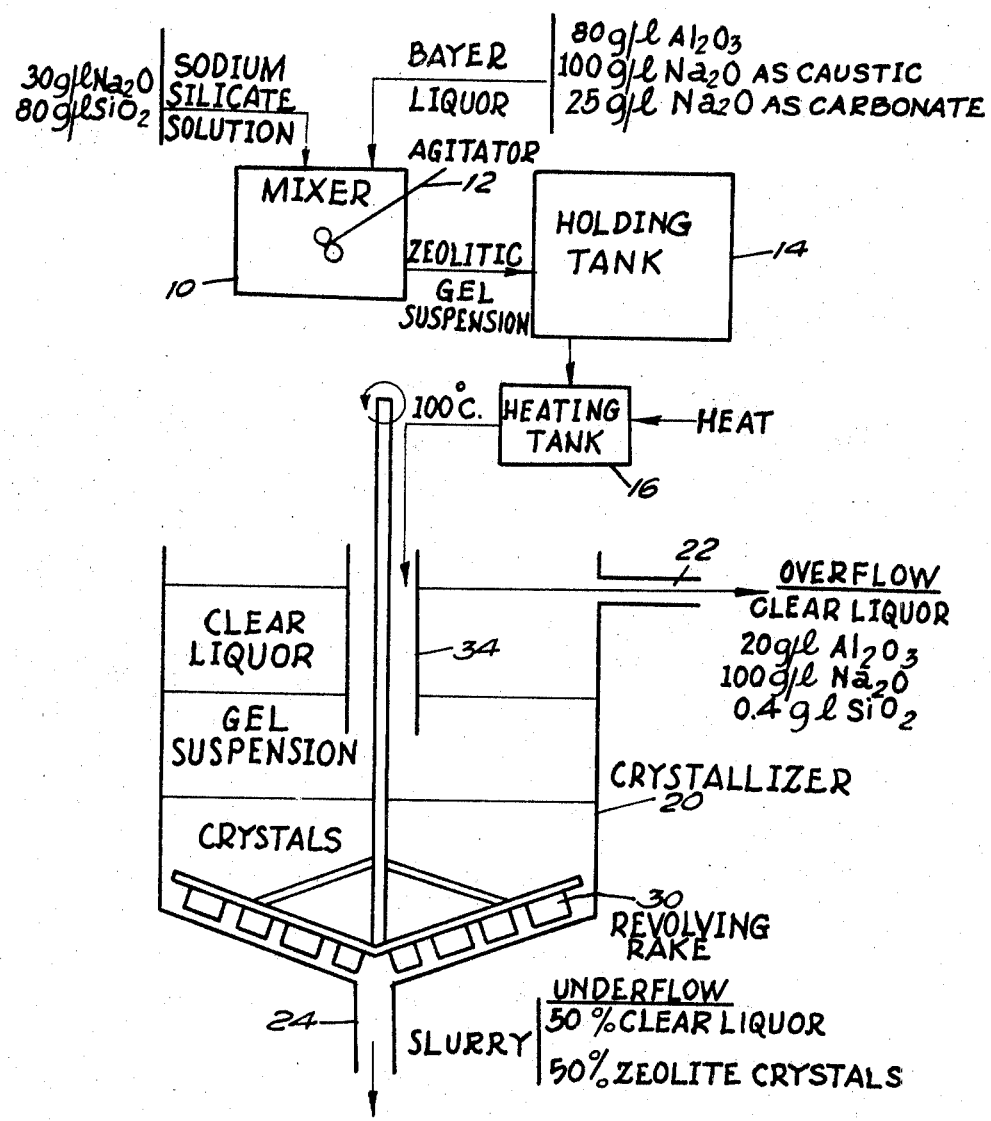
INVENTOR.
WILLIAM HIRSH.
BY Carl R. Lippert
his ATTORNEY.

United States Patent Office 3,425,800
Patented Feb. 4, 1969

3,425,800
PRODUCTION OF CRYSTALLINE ZEOLITES
William Hirsh, Waukegan, Ill., assignor to Aluminum Company of America, Pittsburgh, Pa., a corporation of Pennsylvania
Filed Oct. 5, 1967, Ser. No. 673,046
U.S. Cl. 23—113
Int. Cl. C01b 33/28
8 Claims

ABSTRACT OF THE DISCLOSURE

A synthetic crystalline zeolite, for example sodium zeolite A, is continuously produced by combining suitable reactants and supplying such as a homogeneous gel suspension to the central stratum of a stratified crystallization zone. The crystalline zeolites form in this stratum and settle downwardly into a lower stratum from which they are continuously removed. Clear or depleted liquor separates from the central stratum and is continuously removed from an upper stratum. Crystalline zeolites so formed are substantially free of any gel contamination.

Background

Synthetic crystalline zeolites, which have been described in very general terms as metal-alumino-silicates, are known to exhibit preferences for particular types or sizes of molecules so that they are highly suitable for many separation and sorption processes. These metal aluminum silicates are represented by a general formula:

$$M_{2/n}:Al_2O_3:XSiO_2:YH_2O$$

In the formula, M represents a cation, $n$ represents the valence of the cation, X the mols of $SiO_2$ and Y the mols of $H_2O$. The cation may be one or more of various metal ions particularly the alkali and alkaline earth metal ions, or other common cations such as hydrogen, the most common being sodium, calcium and potassium. One cation may be exchanged for another using conventional ion exchange techniques. The proportions of the elements in the silicates and their arrangement differs from case to case giving the various crystalline zeolites distinct characteristics. The differences in molecular arrangement render the identification of different zeolites possible by means of X-ray diffraction patterns.

Most of the processes for producing synthetic crystalline zeolites are batch type processes and hence are marked by the inherent limitations normally associated with batch schemes. Efforts to develop continuous processes are generally hampered by carryover of the gel into the zeolite crystals. The gel is an inert diluent and functions as an impurity which reduces the specific or unit volume capacity of the zeolite. The basic problem is one of separation since in the continuous processes proposed to date some gel is carried from the reactor to a separate filtration site where the spent liquor, but not all of the gel, is removed. Another restriction is that the only continuous process known to the inventor is limited to the production of only some types of zeolite as indicated in U.S. Patent 3,071,434.

Statement of the invention

In accordance with the present invention a continuous process is provided for the production of synthetic molecular sieves which are substantially free of any gel carryover. In the improved process aqueous solutions of the oxides of the desired ions are mixed in the proper proportions to form the appropriate zeolitic gel. This gel suspension is agitated to assure homogeneity and is preferably heated to a temperature of about 100° C. The heated homogeneous suspension is then supplied to the central stratum of a stratified crystallization zone. The synthetic zeolite crystals form in this central stratum and settle downwardly into a lower stratum from which they can be continuously removed. The clear or depleted liquor separates out of the central stratum to provide an upper stratum wherefrom it can be continuously removed. The strata are maintained as distinct and separate phases. The central stratum is a suspension of a metal-alumino-silicate zeolitic gel in clear liquor. The gel constitutes about 5 to 10% of this phase, by volume. The lower stratum is a slurry containing approximately equal volume parts of clear liquor and zeolite crystals. The upper stratum is substantially all clear liquor. In this description the term "clear liquor" refers to the liquid media in which the gel, as formed in the mixer, is suspended. This liquor contains water and unused dissolved reactants and, in one sense, prevails throughout the crystallization zone. That is, it constitutes about half the lower or crystalline stratum, about 90% of the central or gel suspension stratum and all of the upper or depleted liquor stratum. The upper and lower strata are continuously drained to maintain their respective sizes, i.e., to prevent excessive accumulation of either. The central stratum is maintained by continuously supplying the gel suspension. The clear liquor may be recycled after fortification with the appropriate amounts of reactants to provide a properly proportioned reaction mixture.

Detailed description

The improved method may be employed in the production of the crystalline zeolites known as zeolite A, zeolite X, or any of a number of the known synthetic crystalline zeolites. As is known, the cation of such zeolites can be exchanged using conventional ion-exchange techniques. Because of the convenience associated with the use of sodium as a cation in producing molecular sieves, i.e. its ease of dissolution in water, it may often be preferable to produce sodium zeolite crystals which can then be converted by ion exchange to include other cations if other cations are desired.

The reactants are simply the cation, or cations, alumina, silica and water. The cation is usually of an alkali or alkaline earth metal. Silica gel, silicic acid or sodium silicate are suitable sources of silica. Sodium aluminate, activated alumina or alumina hydrate are suitable sources of alumina. The metal oxide can be provided as caustic, for example, sodium as sodium hydroxide, or as combined with silicate, for example, sodium silicate. One useful source of alumina and sodium is the Bayer liquor produced in the digestion step of the well known Bayer process for the production of alumina hydrate. A typical Bayer liquor composition includes 40 to 120 grams per liter $Al_2O_3$, 50 to 150 grams per liter NaOH and 25 to 75 grams per liter $Na_2CO_3$ together with some small amount, about 0.3 g./l., $SiO_2$.

The reactants are combined in the proper proportions to provide the desired zeolite. All that is essential is that the proper mol ratios of the metallic oxide, alumina, silica and water be provided. For instance, in the preparation of zeolite A the oxide mol ratios of the mixed reactants fall within the ranges:

$Na_2O/SiO_2$—from 0.8 to 3.0.
$SiO_2/Al_2O_3$—from 0.5 to 2.5.
$H_2O/Na_2O$—from 35 to 200.

and in the preparation of zeolite X the oxide mol ratios fall within the ranges:

$SiO_2/Al_2O_3$—from 3.0 to 5.
$Na_2O/SiO_2$—from 1.2 to 1.5.
$H_2O/Na_2O$—from 35 to 60.

The proper reactant mol ratios for the various other zeolites are known from the several patents and other publications disclosing such and need not be repeated here. In practicing the invention the reactants combine in these known ratios to form the appropriate gel corresponding to the desired crystalline zeolite in the same fashion as practiced previously. The most convenient fashion of combining the reactants is to combine previously formed aqueous solutions, for instance, an aqueous solution of sodium aluminate and hydroxide—such as the above-mentioned Bayer process liquor—can be mixed with an aqueous solution of sodium silicate. This results in the formation of an amorphous zeolitic gel suspension which may be formed at room temperature. The rate of reaction is practically instantaneous and the resultant suspension generally contains about 5 to 10% gel suspended in clear liquor.

The rate of crystallization is dependent on the temperature of the gel in that higher temperatures provide shorter crystallization times. For instance, batch crystallization at room temperature may require as long as two weeks time whereas increasing this temperature to 100° C. may shorten this time to as little as one hour or sometimes less. In practicing the invention temperatures up to 150° C. can be employed in the crystallizer. Relatively low temperatures, below 70° C., necessitate rather extensive hold times and are accordingly sometimes less desirable than higher temperatures of 70° to 150° C. A temperature of about 100° C. has been found both convenient to control and effective in obtaining relatively short crystallization times.

Referring to the figure it can be seen that the reactants are combined in a mixer 10 furnished with an agitator 12. The particular reactants depicted for illustrative purposes are sodium silicate and Bayer liquor solutions containing amounts of silica, alumina, caustic soda and sodium carbonate typical for such solutions. The reactants combine almost instantaneously at room temperature to produce the zeolite gel suspension in clear liquor. The mixer is agitated sufficiently to assure a homogeneous suspension. The mixing is done on a batch scale and the homogeneous gel suspension is then transferred to a holding tank 14 wherefrom it is continuously fed to the heating tank 16. In the heating tank the suspension is brought to a temperature of approximately 100° C. and then continuously supplied to the crystallizer. While batch mixing is a highly convenient way to produce the zeolitic gel suspension, such is not a limit on the practice of the invention since the particular manner in which the gel suspension is provided is not of critical importance in practicing the invention. The mixer may be of relatively small size since it serves no other purpose than to mix the reactants which combine almost instantaneously to form the gel suspension. More than one mixer can be employed, if necessary, to provide the desired amount of gel.

As is shown, the gel suspension, preferably heated, is introduced into a central stratum of a stratified crystallization zone. It is in this stratum that crystals form and settle downwardly to form a lower crystal zone consisting of the zeolite crystals and clear liquor. Clear liquor separating from the gel stratum establishes the upper or clear liquor stratum.

The clear liquor stratum may be continuously drained as by the overflow 22 suggested in the figure. The clear liquor may typically contain 0 to 30 or 40 g./l. $Al_2O_3$ and 80 to 120 g./l. NaOH and can be refortified by adding such ingredients as to restore it to a suitable composition for reintroduction to the mixer or it may be useful in some other process such as the Bayer process for refining alumina whereto it can be circulated. The crystalline stratum can be continuously drained as by the underflow 24 shown in the figure. It is preferable to employ a crystallizer with a somewhat tapered or conical bottom and to employ some combing or wiping means for urging the crystals to the underflow conduit. A revolving rake 30 such as that shown schematically in the figure cooperates with the tapered bottom of the crystallizer to facilitate such in a highly satisfactory fashion. It is possible that there may be certain secondray advantages achieved in using a revolving rake since the gentle tumbling action provided thereby as the crystals are urged toward the underflow outlet may prevent them from packing.

In the practice of the invention the respective strata may be maintained simply by balancing the underflow exit and gel introduction streams since the spent liquor stratum can be easily regulated automatically by an overflow. While the central downcomer 34 shown schematically in the figure is a convenient manner in which to introduce the gel to the crystallizer, such may be accomplished in any other suitable fashion. For instance, a pipe entering the gel stratum radially or simply introducing the gel at some point in the clear liquor stratum is satisfactory. If the gel is introduced into the upper stratum, it must settle downwardly to the gel stratum. Accordingly, it is advisable to introduce the gel at some point removed from the overflow and at some level below the overflow in order to minimize any gel shortcircuiting the gel stratum and passing out in the overflow stream. The underflow can be controlled by a pump, valve or other suitable means as may the gel introduction stream.

The crystals emerging from the underflow can be separated from the liquor by filtration or any other suitable means. The crystals are then washed and may be dried. At this point the zeolite crystals can be pelletized by known means or subjected to any other desired procedure such as activation. For instance, after washing but before activation, it is sometimes desired to exchange cations whereby crystalline zeolites produced with a sodium cation can have such exchanged for a calcium or other desired cation employing known ion exchange procedure. After ion exchange, the crystals are washed again. The wash, ion exchange and rewash procedures can be accomplished in a continuous or batch fashion as desired.

The size of the gel stratum is dependent mainly on the desired rate of crystallization in that a larger size will inherently produce more zeolite crystallization. As suggested earlier, the rate of production may also be increased by the use of higher temperatures. Thus where a high rate of production is desired, a large gel stratum is combined with a relatively high temperature. There is no special preference with respect to the size of the spent liquor stratum except that it is preferably large enough to avoid any gel entrainment which might occur in the overflow if it were situated at or near the interface between the gel and clear liquor phases. The volume and depth of the crystalline stratum should be such that no significant quantity of gel is removed with the crystalline material. That is, the gel stratum is maintained and not removed with the crystalline material from the crystalline stratum where crystals are removed from the lowermost portion of the crystallizer; this may be achieved by maintaining the lower, or crystal, stratum so that the interface between the gel and crystalline strata is at a sufficiently high distance above the crystal outlet to substantially preclude gel contamination of the crystals removed. Thus the volume and depth of the crystalline stratum may vary so long as the gel and crystalline strata are so maintained so that any significant gel removal in the crystal removal stream is avoided. In the embodiment depicted in the figure where a revolving rake is employed to aid removal of the zeolite crystals, it is advisable that the depth of the crystalline stratum extend somewhat above the rake to preclude any marked turbulence and mixing at the gel stratum interface which could introduce gel into the crystal stratum. An extension above the rake of at least one foot is advisable and of at least three feet is preferred.

In initiating a process run employing the improved method, the desired zeolitic gel suspension is first formed, normally on a batch scale, according to known methods as described above. The gel suspension is preferably heated and introduced to the crystallizer until it is filled to just short of the overflow level. At this point, gel suspension flow is interrupted since there has been no time for crystals to form, almost the entire contents of the crystallizer at this stage being gel suspension. After a short time, a clear liquor phase will become apparent in the surface portions of the suspension. After passage of further time, crystalline material will be noted at the bottom of the crystallizer developing as a distant phase. This phase is allowed to accumulate until the desired crystal stratum depth is achieved. At this point the underflow and gel introduction streams can be opened to their predetermined flow rates. The duration of the interruption is a function of the crystallization time which varies from one zeolite to another. For instance, in crystallizing zeolite A the time varies from about 1 to 2 hours where the crystallization is effected at a temperature of about 100° C. Once the underflow and gel introduction streams are actuated, the process proceeds in a continuous fashion so long as both streams are maintained.

There are no severe limits on the equipment employed in practicing the invention. The mixer can be any vessel provided with suitable agitating means. Its volume can be relatively small as already indicated. The holding tank, where employed, may be likewise of fairly small size. The heating tank can be even smaller and, if desired, the gel suspension may be heated en route from the holding tank to the crystallizer by heating means in the gel transfer conduit. For instance, mixing, holding and heating tank volumes of respectively 10,000, 15,000 and 2,000 gallons can be employed to provide the heated gel suspension. The crystallizer can be any vessel of suitable size to provide the desired crystal production rate. As already indicated, the crystallizer is preferably provided with some means for handling the crystal slurry underflow. For instance, a tapered bottom preferably combined with a properly fitted revolving rake can cooperate to urge the crystal slurry across the bottom into a central underflow conduit.

EXAMPLE 1

As an illustration of the improved method, an example of the production of zeolite A proceeds. This zeolite is described in U.S. Patent 2,882,243 issued Apr. 14, 1959. Sodium silicate solution and Bayer process liquor are mixed in a batch mixing tank, each batch containing 65 gallons of each solution. The sodium silicate solution contains 11 g./l. $Na_2O$ and 35 g./l. $SiO_2$ and the Bayer liquor contains 74 g./l. $Al_2O_3$, 120 g./l. $Na_2O$ (as caustic) and 50 g./l. $Na_2CO_3$. The mixture is agitated so that the zeolitic gel, which forms instantaneously at room temperature, is distributed uniformly to provide a homogeneous suspension. This suspension is transferred to a holding tank wherefrom it is fed through a heating tank equipped with steam heated tubes which heats it to 100° C. The suspension is then introduced into the crystallizer through a downcomer such as that depicted schematically in the figure. After filling the crystallizer volume of about 450 gallons to a point slightly below the overflow, which requires several batches of gel suspension, the feed is interrupted. In a relatively short time after the crystallizer is filled, a clear liquor stratum appears in the surface portion of its contents. After about 1½ hours the depth of the crystal bed is observed to be approximately three feet, about one third total depth of the crystallizer. The underflow and the gel introduction stream valves are now opened. The gel suspension is continuously fed at a rate of about 200 gallons per hour and the underflow continuously removed at a rate which maintains the desired depth, 3 feet, of the crystalline stratum. In this case the depth of both the crystal and gel strata are about three feet. The clear liquor stratum is about four feet. The clear liquor is removed at a rate of about 180 gallons per hour and it contains approximately 23 g./l. $Al_2O_3$, 56 g./l. $Na_2O$, 27 g./l. $Na_2CO_3$ and 0.36 g./l. $SiO_2$. This run produces zeolite A at a rate of about 80 to 100 pounds per hour. Chemical and X-ray diffraction analyses confirm that the crystals produced are sodium zeolite A and that they are completely free of any gel contamination.

EXAMPLE 2

As a further illustration of the improved method, an example on the production of zeolite X follows. This zeolite is described in U.S. Patent 2,882,244 issued Apr. 14, 1959. Sodium silicate solution and Bayer liquor are mixed in a batch mixing tank, each batch containing 62.5 gallons of sodium silicate solution and 63.8 gallons of Bayer liquor. The sodium silicate solution contains 31 g./l. $Na_2O$ and 102 g./l. $SiO_2$. The Bayer liquor contains 54.1 g./l. $Al_2O_3$, 100 g./l. $Na_2O$ (as caustic), 45 g./l. $Na_2CO_3$ and 0.3 g./l. $SiO_2$. Each batch mixture is agitated and instantaneously forms a homogeneous suspension of zeolitic gel in clear liquor. This suspension is transferred to a holding tank and fed through a heating tank which increases its temperature to about 85° C. The heated gel suspension is introduced into the crystallizer and interrupted according to the procedure set forth in Example 1. After about 8 hours the depth of the crystal bed is observed to be approximately three feet, and the underflow and gel introduction stream valves are opened. The gel suspension is continuously fed into the crystallizer at a rate of about 10 gallons per hour and the underflow continuously removed at a rate which maintains the desired depth, 3 feet, of the crystalline stratum. As in Example 1, the gel and clear liquor strata are maintained at respective depths of three and four feet. The clear liquor is removed through the overflow at a rate of approximately 8 to 9 gallons per hour and contains approximately 50 g./l. $Na_2O$, 25 g./l. $Na_2CO_3$ and 12.5 g./l. $SiO_2$. This run produces zeolite X at a rate of about 10 pounds per hour. Chemical and X-ray diffraction analyses confirm that the crystals are sodium zeolite X and that they are completely free of any gel contamination.

What is claimed is:
1. A continuous method for synthesizing a crystalline zeolite comprising:
   (1) reacting water, silicate ions, aluminate ions and metal ions selected from the group consisting of alkali metal ions and alkaline earth metal ions in the proportions required to form crystals of said zeolite to provide a metal-alumino-silicate gel suspension in clear liquor,
   (2) continuously supplying said gel suspension to the central stratum of a stratified crystallization zone in which central stratum zeolite crystals form and wherefrom they settle downwardly into a lower stratum and wherefrom clear liquor separates to provide an upper stratum,
   (3) continuously removing the clear liquor from the upper stratum, and
   (4) continuously removing the zeolite crystals from the lower stratum.

2. The method according to claim 1 wherein said gel is continuously supplied to said central stratum at a temperature f 70 to 150° C.

3. The method according to claim 1 wherein the metal ions are sodium ions.

4. The method according to claim 3 wherein the reactants are Bayer liquor and sodium silicate solutions.

5. The method according to claim 1 wherein the crystals are removed from said lower stratum through an underflow conduit to which they are urged by the action of a wiping means.

6. The method according to claim 1 wherein said lower stratum is maintained to substantially preclude any gel contamination of the removed crystals.

7. A method of synthesizing sodium zeolite A crystals comprising:
  (1) reacting water, silicate ions, aluminate ions and sodium ions in such proportions that the oxide mol ratios of the mixed reactants fall within the ranges:
  $Na_2O/SiO_2$—from 0.8 to 3.0
  $SiO_2/Al_2O_3$—from 0.5 to 2.5
  $H_2O/Na_2O$—from 35 to 200
  to provide a sodium-alumino-silicate gel suspension in clear liquor at a temperature of 70° to 150° C.,
  (2) continuously supplying said gel suspension to the central stratum of a stratified crystallization zone in which central stratum said zeolite crystals form and wherefrom they settle downwardly into a lower stratum and wherefrom spent liquor separates to provide an upper stratum,
  (3) continuously removing the spent liquor from the upper stratum,
  (4) continuously removing the zeolite crystals from the lower stratum while maintaining said lower stratum to substantially preclude gel contamination of the removed crystals.

8. A continuous method of synthesizing sodium zeolite X crystals comprising:
  (1) reacting water, silicate ions, aluminate ions and sodium ions in such proportions that the oxide mol ratios of the mixed reactants fall within the ranges:
  $SiO_2/Al_2O_3$—from 3.0 to 5
  $Na_2O/SiO_2$—from 1.2 to 1.5
  $H_2O/Na_2O$—from 35 to 60
  to provide a sodium-alumino-silicate gel suspension in clear liquor at a temperature of 70° to 150° C.,
  (2) continuously supplying said gel suspension to the central stratum of a stratified crystallization zone in which central stratum said zeolite crystals form and wherefrom they settle downwardly into a lower stratum and wherefrom spent liquor separates to provide an upper stratum,
  (3) continuously removing the spent liquor from the upper stratum,
  (4) continuously removing the zeolite crystals from the lower stratum while maintaining said lower stratum to substantially preclude gel contamination of the removed crystals.

References Cited

UNITED STATES PATENTS

| | | | |
|---|---|---|---|
| 2,882,243 | 4/1959 | Milton | 23—113 |
| 2,882,244 | 4/1959 | Milton | 23—113 |
| 2,904,607 | 9/1959 | Mattox et al. | 252—455 X |
| 3,071,434 | 1/1963 | Frilette et al. | 23—113 |
| 3,321,272 | 5/1967 | Kerr | 23—113 |

EDWARD J. MEROS, *Primary Examiner.*